March 11, 1952     J. H. McLEOD     2,589,014
FOCUSING VIEW FINDER SYSTEM
Filed Feb. 14, 1951     4 Sheets-Sheet 1

John H. McLeod
Inventor

Daniel I. Mayne
F. M. Emerson Holmes
Attorneys

March 11, 1952     J. H. McLEOD     2,589,014
FOCUSING VIEW FINDER SYSTEM
Filed Feb. 14, 1951     4 Sheets-Sheet 2

John H. McLeod
Inventor

Daniel I. Mayne
F. M. Emerson Holmes
Attorneys

March 11, 1952  J. H. McLEOD  2,589,014
FOCUSING VIEW FINDER SYSTEM
Filed Feb. 14, 1951  4 Sheets-Sheet 3

John H. McLeod
Inventor

By Daniel J. Mayne
F. W. Emerson Holmes
Attorneys

March 11, 1952

J. H. McLEOD 2,589,014

FOCUSING VIEW FINDER SYSTEM

Filed Feb. 14, 1951

John H. McLeod
Inventor

By Daniel J. Mayne
F. M. Emerson Holmes
Attorneys

Patented Mar. 11, 1952

2,589,014

UNITED STATES PATENT OFFICE 2,589,014

FOCUSING VIEW FINDER SYSTEM

John H. McLeod, Rochester, N. Y., assignor to Eastman Kodak Company, Rochester, N. Y., a corporation of New Jersey Application February 14, 1951, Serial No. 210,912

6 Claims. (Cl. 88—1.5)

This invention relates to focusing view finder systems, i. e. systems which present an image of an extended object or field of view and indicate when the image is in or out of focus. Such systems consist essentially of an objective, a viewing screen and means for adjusting the separation between the two.

The object of the present invention is to provide a focusing view finder system of greatly increased brightness. A simple focusing finder having a ground glass or other diffuser has relatively low brightness compared to a brilliant finder, but of course the latter cannot be used for focusing since the image plane is not optically defined in a brilliant system. Prior to the present invention the brightest focusing system available consisted of an objective, a light diffusing screen and a field lens associated with the screen, for example a field lens of the Fresnel type. According to the present invention a focusing finder is produced which by actual measurement is over 100% brighter than this best previous system and in fact is 2½ to 3 times as bright, almost as bright as the scene itself. As pointed out by Hardy & Perrin in their text "The Principles of Optics" page 417, "No optical instrument is capable of making an extended object appear any brighter than it appears to the unaided eye." With due allowance for the losses by reflection at the optical interfaces, it has been found that the present invention approaches surprisingly close to this ultimate theoretical goal, although no prior focusing finder had more than a small fraction of this efficiency.

A simple ground glass located in the plane of a real image formed by an objective serves two purposes. First it insures that light reaches the eye of the observer from all parts of the image, wherever the eye is located. It does this by scattering the light in all directions. Obviously this is quite inefficient with respect to brightness since much of the light is wasted in directions other than that of the eye. Secondly, the ground glass indicates lack of focus by displaying the circle of confusion of each point which is out of focus.

The first of these functions can be performed efficiently for an observer's eye placed on the optic axis of the system, by a field lens. A brilliant finder does this but cannot indicate lack of focus. A Fresnel lens of proper power adjacent to a ground glass does this. According to the present invention this complete combination is used except that the ground glass is replaced by an optical element which performs the second function only of the ground glass, namely the indicating of lack of focus, and it performs this function with the minimum scattering of light. The present invention obtains its high efficiency, which is its main object, by this complete combination in which the objective forms an image and the two operations which are to be performed on the image are delegated to separate optical elements. A Fresnel lens provides the light gathering operation and a conical screen provides the focus indicating operation. The conical screen would be useless without the Fresnel lens and the operation of the whole system requires proper interrelationship of the three elements. The objective and the Fresnel lens must have substantially the same focal length if the Fresnel lens is to act properly as a field lens. The shape of the cones on the conical element must bear a special relationship to the aperture of the objective if it is to utilize this aperture for focusing. Finally, there must be the usual means for adjusting the distance between the objective and the conical surface for focusing, if the device is to constitute a focusing view finder.

It is the object of a preferred embodiment of the invention to provide a focusing view finder of the above discussed type in which the conical elements are small, more than ten thousand elements per square inch, so as not to interfere appreciably with the definition of the image. Screens with from 100,000 to 9,000,000 preferably 1,000,000 elements per square inch are eminently satisfactory. In the preferred embodiment these elements are arranged in parallel wavy lines which reduces the possibility of moire pattern with the associated Fresnel lens and which also reduces the diffraction patterns from the conical screen itself to a minimum. Such patterns can be seen by projection but are not usually apparent in a view finder system and hence are not objectionable.

The conical surface may have either small cones protruding from a flat surface of glass or plastic or may consist of conical depressions in such a surface. The cone screen may face in either direction relative to the incident light and it may be on the same plastic sheet as the Fresnel lens or the two elements may be on separate sheets. The Fresnel lens may also face in either direction and in one preferred embodiment of the invention the conical surface and the Fresnel surface are on different plastic sheets and face each other for protection from dust and wear. The Fresnel lens should have fine elements less than $\frac{1}{50}$ inch wide so as not to interfere with the image quality. Of course the Fresnel lens is out of focus since it is not in exactly the same place as the cone screen although it may be very close thereto.

It should be noted that neither the cone screen nor the Fresnel lens is intentionally light diffusing. Molded elements of this type are not perfect of course and may appear diffusing but the degree of diffusion is small and does not affect the present invention. The dispersion of light by the cone screen is in a cone and is not a general diffusion of the light.

The advantages and principle of the present invention will be more fully understood from the following description when read in connection with the accompanying drawings in which:

Fig. 1 illustrates in cross section a simple finder according to the present invention;

Fig. 2 similarly illustrates another embodiment of the invention;

Figure 1:
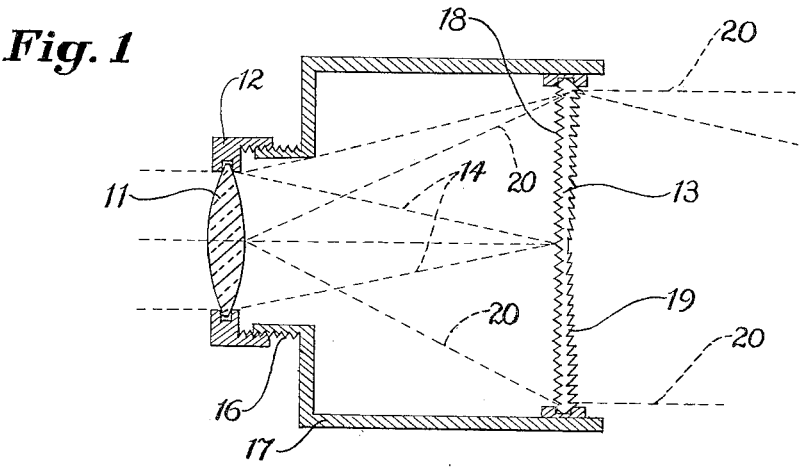

In Fig. 1 an objective 11 carried in a focusing mount 12 forms a real image on a screen 13 as indicated by rays 14. The separation of the screen 13 and the objective 11 is adjustable by rotating the mount 12 on a screw thread 16 on the front of the housing 17 which supports the screen 13. The front surface 18 of the screen 13 is provided with conical elements each of which may be thought of as a prism bent into circular form. The image is focused on this front surface. The rear surface of the screen 13 is provided with a Fresnel lens 19 whose focal length as indicated by rays 20 is approximately equal to the focal length of the objective 11. The Fresnel lens acts primarily as a field lens and the focal lengths of this field lens and the objective need be the same only to the degree of approximation normally required by a field lens. In fact as the objective is focused for near objects, a theoretically perfect field lens would be one whose power changes to match the changing conjugates. Also, if the eye of the observer is always to be at one fixed point, the preferable power of the Fresnel lens would be that which makes the distance from the Fresnel lens to the objective conjugate to that from the Fresnel lens to the eye. All of these modifying factors are known, of course, and their small effect is encompassed by the term "approximately" i. e. approximately equal focal lengths of the objective and the Fresnel lens.

Figure 2:
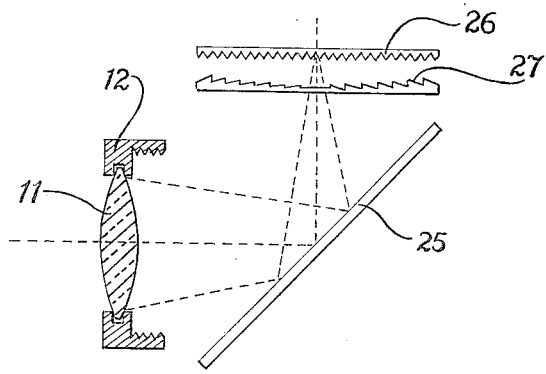

In Fig. 2, the optical system of a reflux finder according to the present invention is shown in which the light from the objective 11 is reflected by a front surface mirror 25 to a conical surface 26 which in this case is carried on a separate sheet from the Fresnel lens 27. Also the Fresnel lens is optically ahead of the conical surface 26 and the elements face each other. Either element may face in either direction without interfering with the essential operation of the present invention. The conical surface is the one on which the image is viewed.

Figure 3:
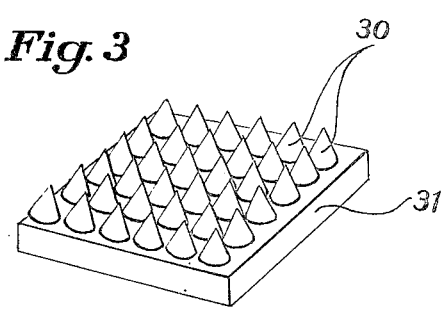
Figs. 3 and 4 are perspective views of greatly enlarged sections of two forms of a conical screen used in the present invention.

As shown in Fig. 3 the conical surface may consist of a large number of positive cones 30 protruding from and forming the surface of a transparent plastic sheet 31. From a manufacturing point of view this is one of the simplest forms of cone sheet. The mold for molding such a screen is constructed by hammering the surface of a metal block with a hammer of predetermined conical shape. Each blow of the hammer is given with exactly the same force and the hammer is moved a predetermined small distance between successive blows so as to distribute the cones either rectilinearly or in any desired pattern. The metal block is then used as one face of a mold and a molded screen thus comes from the mold with positive cones as shown in Fig. 3.

Figure 4:
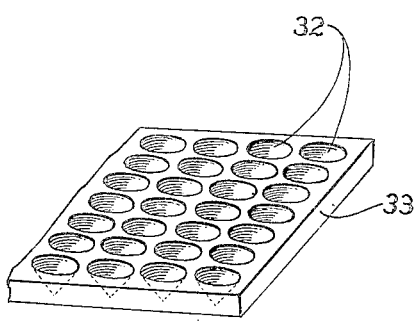

In Fig. 4 the cones 32 are formed as depressions in the surface of a plastic sheet 33. That is, this sheet is molded from a mold having positive cones on the face thereof. The most convenient way of making such a mold is by a two-step operation from the negative mold hammered into a block as described above.

Figure 5:
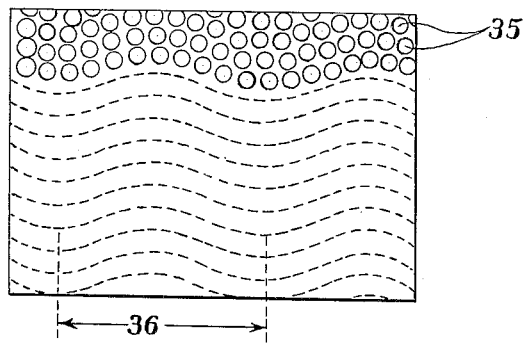
Fig. 5 is a greatly enlarged plan view of a conical screen according to a preferred embodiment of the invention.

In Fig. 5 the conical elements are distributed on the sheet in parallel wavy lines, approximately but not necessarily sinusoidal in form. The cones 35 are shown at the top of the drawing and the wavy lines representing the locus of other conical elements are shown in the remainder of the figure. A wavy line in general has a dimension 36 which may be referred to as the wave length of the wavy line. The reason that this dimension is mentioned, is the fact that the waviness serves its purpose only if this wave length is several times the width of each element, i. e. more than 3 times and less than 15 times. If the wave length is less than 3 times the element width, the diffraction patterns are not minimized. For example, the common hexagon arrangement associated with closely packed circles might be thought of as a wavy line whose wave length was just less than twice the diameter of one element. At the other extreme, a wave length of more than 15 elements wide gives a screen which for practical purposes approaches one having the cones arranged in straight lines. Of course, a conical screen with the cones arranged in straight lines is quite operable in certain embodiments of the present invention, but the preferred embodiment in which the diffraction patterns are minimized requires a matrix of wavy lines with the wave length several times the width of each element. Screens with a wave-length equal to six element widths have been found to have the same effect as those with a wave length equal to ten element widths.

Figure 6:
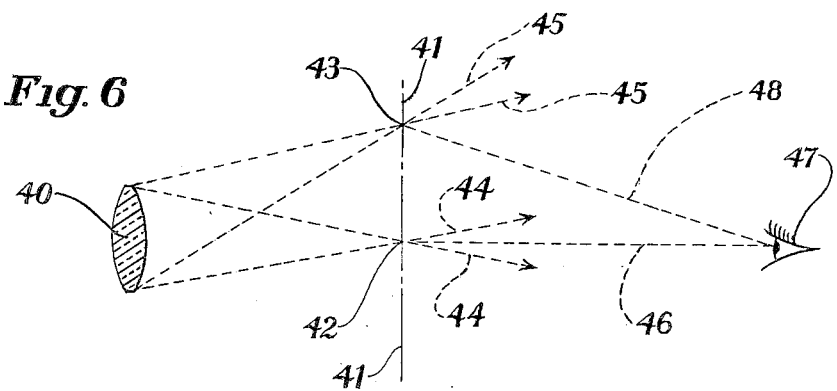
Figs. 6–10 are optical diagrams to illustrate the principle of the invention.

In Fig. 6 an objective 40 focuses an image in a plane 41 with the center of the image at the point 42 and one edge of the image at the point 43. The solid cone of light from these points is represented by arrows 44 and 45. A central ray 46 from the point 42 goes directly to the observer's eye 47. However, none of the light from the point 43 between the rays 45 would reach the observer's eye 47. In the present invention this problem is overcome by a Fresnel lens (not shown in this Fig. 6) which bends the light from the point 43 toward the optic axis of the system so that at least one ray 48 in the pencil or cone of light 45 reaches the eye 47. Depending on the power of the Fresnel lens, this ray may be the principal ray, i. e. the central ray of the pencil whose edges are represented by the rays 45, or it may be any ray within this pencil.

Figure 7:
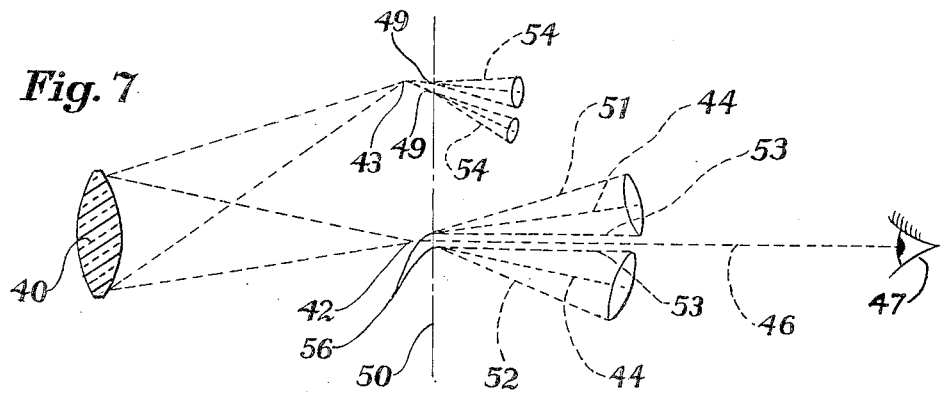

In Fig. 7 a conical screen 50 is placed out of focus, optically behind the focal points 42 and 43. A cone of refractive material converts a ray of light into a hollow cone of light. If there were no conical surface on the screen or no dispersing surface of any type, the eye would still receive only one ray from each point of the image and would not be aware of lack of focus, for example the central ray 46 from the center point 42 and a ray in the pencil 49, directed to the eye from the point 43 by the Fresnel lens (not shown). The conical screen 50 separates each ray 44 into a cone of light as shown at 51, 52 and 53. These cones are hollow cones for any one incident direction so that there is an ever expanding ring of light going out from each point of the image. Actually the pencil of light arriving at the point 42 from the lens 40 is a solid cone of rays each of which produces a hollow cone and the hollow cones add up to a large solid cone of light from the point 42. The individual hollow cones 51 and 52 made from the rays 44 each have a conical half angle such that the inner edges 53 of the two cones are parallel to each other and to the principal ray 46 from the point 42. Of course, the conical screen 50 also spreads the ray 46 into a hollow cone but this is not shown, since the ray 46 is included merely for reference in connection with the size of the cones 51 and 52. The inner edge rays 53 reach the eye and thus display the circle of confusion 56 showing that the point 42 is out of focus. Similarly the edge rays 49 are made into cones 54 to display to the eye of the observer the out of focus image on the screen 50 of the point 43.

Figure 8:
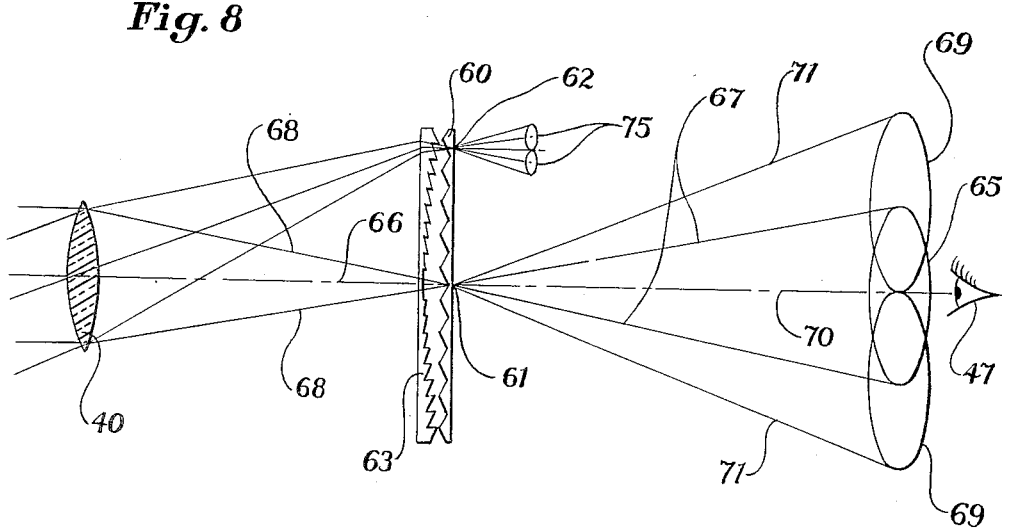
Figure 9:
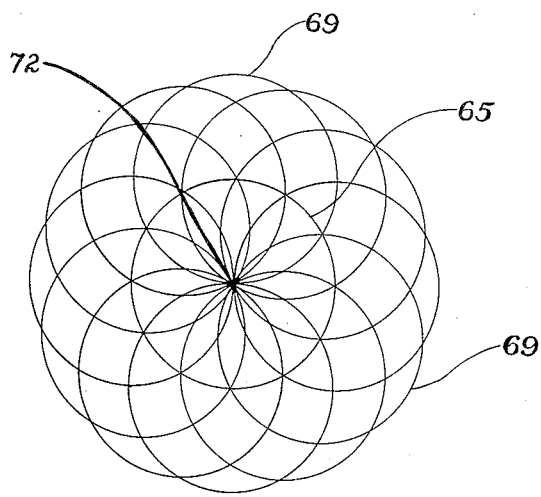

In Fig. 8 the objective 40 forms an image in the plane of a cone screen 60, the center of the image being at the point 61 and the rays 66 and 68 forming this image point 61, pass undeviated through the center of a Fresnel lens 63. Except for the effect of the cone screen 60 this pencil of light 68 would spread as a solid cone (forming exit pupil 65) toward the eye 47 of the observer. However, the cone screen 60 spreads the center or paraxial ray 66 into a hollow cone which happens to be of the same dimensions as this solid cone (pupil 65) would have been without the cone screen. That is, the ray 66 emerges along a conical surface represented by rays 67. The marginal rays 68 would, in the absence of the cone screen 60, emerge as rays 67. However, the cone screen deviates each of the rays 68 to form a hollow cone (with exit pupil at 69), so that part of the light 68 passes along the axis 70 and part passes along the outer rays 71 and other lines on the cones. Thus the cone surface 60 effectively changes the exit pupil 65 into an infinite number of exit pupils 69 as shown in Fig. 9 whose centers are on the circumference of the exit pupil 65 and which osculate at the center 72 of the original exit pupil 65. Thus, when the eye 47 is placed on the optic axis it receives light through all of the exit pupils 69. If the cone screen 60 is moved out of focus, the eye 47 will see a circular spot of light for each point, and will receive light from all of the spot. Furthermore, a minimum of light is wasted while obtaining this effect.

As shown by the small cones 75, the same effect is obtained for the light at the edge 62 of the image, since this light is also received perpendicularly after deviation by the Fresnel lens 63.

It is noted that if the aperture of the lens 40 is decreased (view finder lenses do not normally have adjustable diaphragms except when the camera lens itself is used as the view finder lens), the exit pupils 69 become smaller and no longer osculate so that the eye of the observer would not receive any light, at least theoretically. In practice, of course, the small cones are not perfect and part of their area deviates the light slightly differently from the theoretically perfect cone so that the exit pupils are not absolutely precisely defined, and slight decrease in lens aperture does not obliterate the image immediately. The present invention substantially requires the cone screen to match the lens aperture, however. On the other hand, if the lens aperture has to be variable for some reason, it is possible to make the cone screen the right shape i. e. with the right conical half angle for a small aperture and with some loss in focus sensitivity to use the objective at any aperture equal to or larger than the one for which the cone screen is designed. It is interesting to note what happens when a screen with an f number different from the f number of the lens is used. When an f/4 screen is used with an f/2 lens, the focus sensitivity is reduced to that of an f/4 lens, but the brightness is still as high as if an f/2 screen had been used. On the other hand, if this f/4 screen is used with an f/8 lens, the brightness goes down (theoretically it would be zero for out of focus images, but in practice this is not true) and also the focus sensitivity is slightly lower, but in this case failure to have perfection actually improves the focus sensitivity a little.

Another interesting characteristic to note is that an f/4.5 lens with an f/4.5 screen is just as bright as say an f/2.8 lens with an f/2.8 screen, but the focus sensitivity of the f/2.8 combination is much higher. This constancy of brightness is due to the fact that the optical system independent of its aperture is approaching the theoretical maximum in which the image brightness equals that of the original scene itself.

In this theoretical discussion the eye of the observer has been considered as on the optic axis of the system. However, the invention is operable with the eye off axis. In fact binocular viewing may be used and if, for example, the two eyes of the observer are both on the circle 65 in Fig. 9, each eye receives enough of each out of focus image to allow accurate focusing. That is, each eye theoretically includes about half of the elementary circles and in practice includes much more than this half. Also the brightness for each eye is less than it would be on the axis but this is at least partially compensated for by the two-eye vision.

One feature of this two-eye vision which was not anticipated but which was observed in the first practical tests is the fact that the objects appear in stereo. This is because the right eye being on the average in the right sides of the elementary exit pupils 69 sees through the left side of the objective and the left eye similarly sees through the right side of the objective. One does not see pseudo stereo because the picture is reversed, (laterally inverted). Furthermore, this stereo effect does not interfere with the focusing ability of the instrument; this point is mentioned since stereo instruments often are not subject to critical focusing.

The cross section of a pure cone is circular and in general the present invention uses cones of circular cross section but any approximation thereto works reasonably well, e. g. the cone may be approximately a pyramid with four or more sides especially if the sides are transversely curved so as to approximate a cone quite closely. Variations in slope of the cone, however, reduce the efficiency of the system, so that spherical elements, for example, fail to provide the unique efficiency of cones in a focusing finder. In practice spherical element screens are not very different from ground glass as far as focusing finders are concerned.

Although the conical elements are actually very small and may be convex or concave and may face in either direction, the slope of the cone or the half angle thereof must bear a certain relationship to the aperture of the objective in order to produce maximum efficiency of brightness while at the same time producing maximum focus sensitivity.

Figure 10:
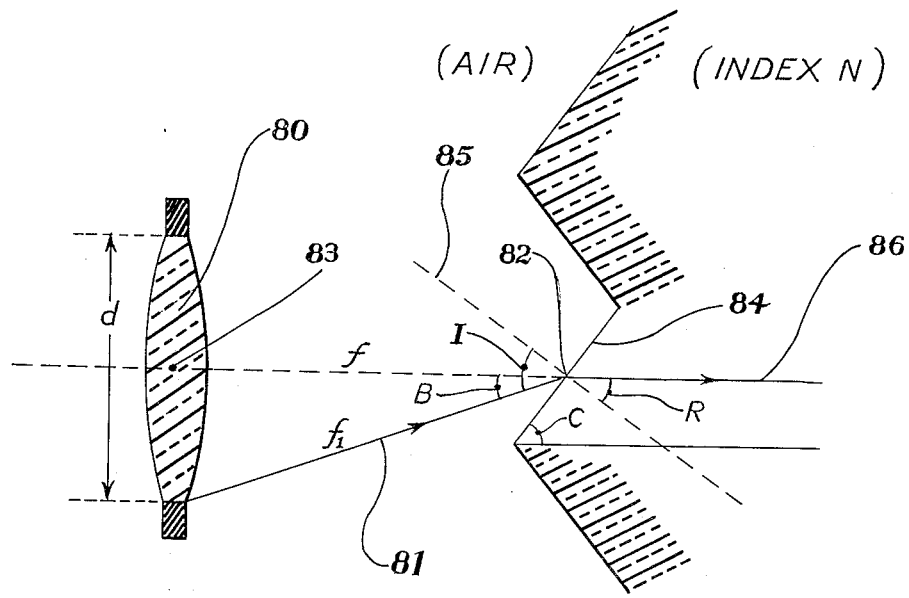

Fig. 10 constitutes an exaggerated schematic diagram in order to explain this relationship exactly. In Fig. 10 an objective 80 has a focal length f measured from the nodal point 83 to the focal point 82 and it has a slant focal length $f_1$ measured from the margin of the lens. The diameter of the lens opening is d and the f number of the lens is approximately $$\frac{f}{d}$$

or more exactly $$\frac{f_1}{d}$$

An approximation is introduced below which will result in the same formula whether the relative aperture is taken as $$\frac{f}{d}$$

or $$\frac{f_1}{d}$$

but both cases will be included for clarity

From Fig. 10 it will be seen that:

$$A = \frac{f_1}{d} \left(\text{approximately} = \frac{f}{d}\right)$$

where A is the aperture or f number.

$$A = \frac{1}{2 \sin B}$$

I = angle of incidence of ray 81 on cone surface 84 at point 82; line 85 being normal to the surface.

R = angle of refraction, the slope of surface 84 being selected so that the ray 81 emerges along the line 86 parallel to the optic axis of the system.

C = half angle of cone, i. e. slope of surface 84.
N = index of refraction of material of cone.
R = I − B
C = 90 − R $$\sin B = \frac{1}{2A}$$

$$\cos B = \frac{\sqrt{4A^2 - 1}}{2A}$$

sin I = N sin R  (Snell's law)
= N cos C

Also  sin I = sin (R+B)
= sin (B+90−C)
= sin B sin C + cos B cos C $$N = \sin B \frac{\sin C}{\cos C} + \cos B \frac{\cos C}{\cos C}$$

= sin B tan C + cos B $$\tan C = \frac{N - \cos B}{\sin B}$$

$$= \frac{N - \frac{1}{2A}\sqrt{4A^2 - 1}}{\frac{1}{2A}}$$

$= 2AN - \sqrt{4A^2 - 1}$
$= 2A(N-1)$ when A is large

If the aperture A were taken as $$\frac{1}{2 \tan B}$$

instead of $$\frac{1}{2 \sin B}$$

the formula comes out:

$$\tan C = N\sqrt{4A^2 + 1} - 2A$$

which again equals $2A(N-1)$ when A is large.

Thus the half angle of the cone in the conical screen to obtain the theoretical maximum efficiency should be approximately C where tan C=2A(N−1). As pointed out above the cones need not be perfect. Slight reduction from optimum efficiency does not appreciably affect the brightness and allows freedom in selection of the eye position which is desirable and also allows the aperture of the objective to be somewhat less than optimum. A number of approximtaions have been discussed, but they are all of small order and perhaps the smallest of them is the approximation in which tan C is made equal to 2A(N−1) rather than the more exact formula in which $$\sqrt{4A^2 - 1}$$

is used. In practice, the cones are not molded with an accuracy greater than that represented by the approximate formula for the half angle. Nevertheless these conical screens in combination with an objective of the proper aperture and a Fresnel lens to take care of the light directing function of the viewing screen, provide screens which approach the theoretical maximum in brightness and focus sensitivity and which are about 3 times brighter than the best previous focusing system and perhaps a hundred to a thousand times brighter at the edges of the screen than the usual ground glass alone.

Having thus described the preferred embodiments of my invention, I wish to point out that it is limited only by the scope of the appended claims.

I claim:

1. A focusing view finder system comprising an objective of relative aperture A for forming a real image of an object to be viewed, a sheet of light refractive material of index of refraction N with one surface adjustably at the plane of said image, said surface having more than 10,000 elements per square inch each element having a conical surface whose conical axis is perpendicular to the sheet and whose conical half angle is approximately C where tan C=2A(N−1), a positive Fresnel lens whose focal length approximately equals that of said objective and whose Fresnel elements are less than 1/50 inch wide adjacent to said plane in optical alignment with said objective, and means for adjusting the distance between the objective and the conical surface for focusig.

2. A system according to claim 1 in which the conical surface and the Fresnel lens are on opposite sides of the same sheet of transparent material.

3. A system according to claim 1 in which the conical surface and the Fresnel lens are on different sheets of transparent material and face each other.

4. A system according to claim 1 in which the conical elements are arranged in parallel wavy lines with the wave length several, i. e. more than three and less than fifteen, times the width of each element.

5. A focusing view finder system comprising an objective of focal length f and diameter d for forming a real image of an object to be viewed, a positive Fresnel lens of focal length approximately f adjacent to said image and optically aligned with the objective, a light diverging surface adjustably at the plane of said image and on a transparent sheet of index of refraction N, said surface having conical elements perpendicular to said plane with conical half angles approximately equal to C where $$\tan C = \frac{2f}{d}(N-1)$$

and means for adjusting the distance between the objective and the light diverging surface.

6. A system according to claim 5 in which the conical elements are arranged in parallel wavy lines with the wavelength several, i. e. more than three and less than fifteen, times the width of each element.

JOHN H. McLEOD.

No references cited.